United States Patent [19]

Jansen

[11] Patent Number: 4,607,867
[45] Date of Patent: Aug. 26, 1986

[54] APPARATUS FOR SECURING A HOSE TO A FITTING

[75] Inventor: George A. Jansen, Denver, Colo.

[73] Assignee: Houdaille Industries, Inc., Ft. Lauderdale, Fla.

[21] Appl. No.: 670,557

[22] Filed: Nov. 9, 1984

[51] Int. Cl.⁴ .................................................. F16L 33/00
[52] U.S. Cl. ................................... 285/242; 285/252; 285/257; 285/259
[58] Field of Search .............. 285/242, 243, 252, 253, 285/256, 257, 259

[56] References Cited

U.S. PATENT DOCUMENTS

| | | | |
|---|---|---|---|
| 134,158 | 12/1872 | Nutting | 285/114 |
| 487,893 | 12/1892 | Schimper et al. | 285/242 |
| 909,003 | 1/1909 | Lepage | 285/259 |
| 921,079 | 5/1909 | Burtscher | 285/257 |
| 1,426,086 | 8/1922 | Lowrey | 285/253 |
| 1,477,573 | 12/1923 | Lowrey | 285/259 |
| 1,919,860 | 7/1933 | Reutter et al. | 285/257 |
| 1,965,426 | 7/1934 | Nelson | 285/257 |
| 2,314,000 | 3/1943 | Lusher et al. | 285/84 |
| 2,455,760 | 12/1948 | Gustafson | 285/242 |
| 2,522,684 | 9/1950 | Mitchell | 285/84 |
| 2,958,549 | 11/1960 | Spafford | 285/243 |
| 3,174,777 | 3/1965 | Lodholm et al. | 285/252 |
| 3,367,683 | 2/1968 | Mattson | 285/243 |
| 4,093,282 | 6/1978 | Kyriskodis | 285/114 |

OTHER PUBLICATIONS

Band-It Hose Nipples.

*Primary Examiner*—Cornelius J. Husar
*Assistant Examiner*—Eric K. Nicholson
*Attorney, Agent, or Firm*—Sheridan, Ross & McIntosh

[57] ABSTRACT

A flexible hose is secured to a fitting using elongated strips and band clamps in a conventional manner so as to prevent relative longitudinal movement between the flexible hose and the elongated strips. One end portion of each of the elongated strips is bent back so as to be contiguous to the next succeeding portion of the elongated strip so as to form a shoulder and a recess is formed in the fitting. The bent back portions are seated in the recess and retained therein by a band clamp acting on the next succeeding portion so that relative longitudinal movement between the elongated strip and the fitting is prevented by an abutting relationship between the shoulder of the bent back portion and a shoulder of the recess.

10 Claims, 4 Drawing Figures

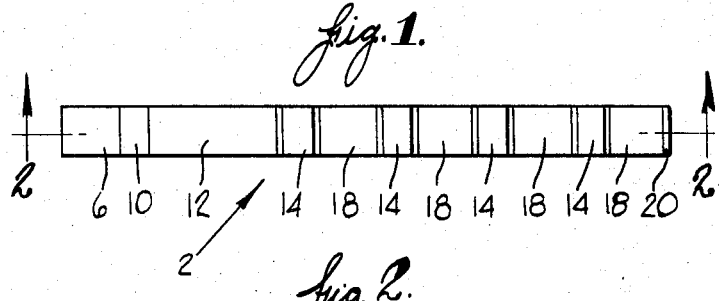
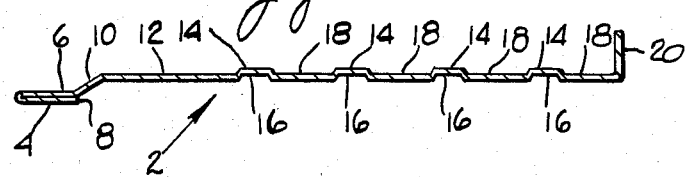
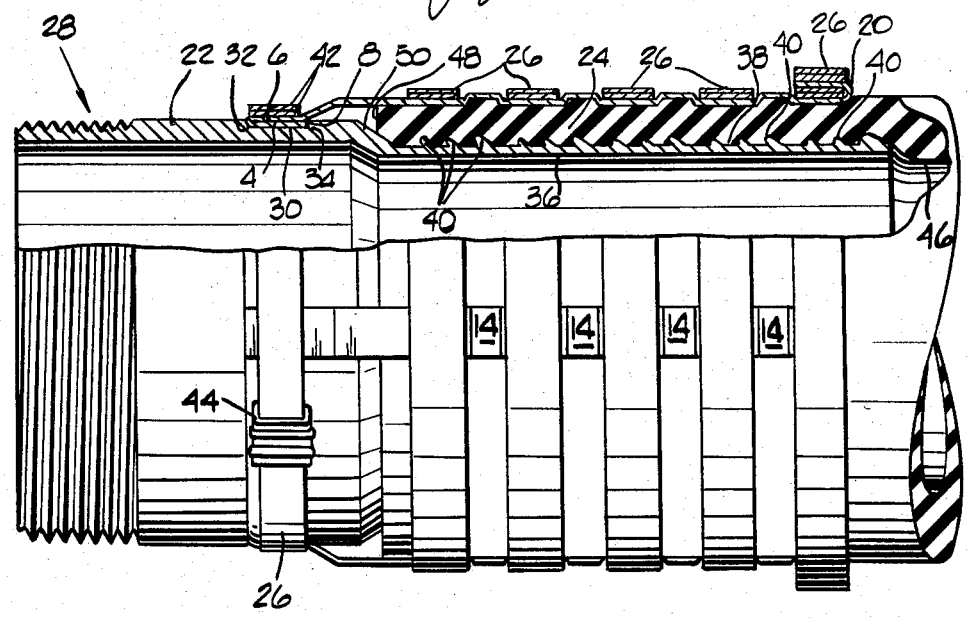

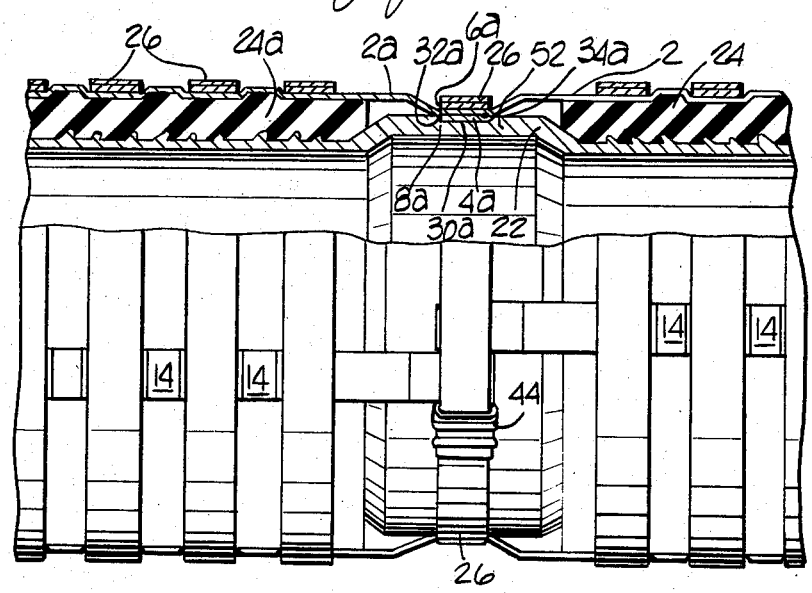

APPARATUS FOR SECURING A HOSE TO A FITTING

FIELD OF INVENTION

This invention relates to the field of connecting flexible hoses to fittings and more particularly to the field of connecting flexible hoses to fittings in systems using high pressures wherein it is necessary to limit relative longitudinal movement between the flexible hose and the fitting to insure that there is no separation of the flexible hose and fitting.

BACKGROUND OF THE INVENTION

In one type of apparatus for securing a flexible hose to a fitting, such as full flow hose nipples marketed by Band-It Division, Houdaille Industries, Inc., the fitting has an annular recess which cooperates with a yoke to provide means limiting relative longitudinal movement between the flexible hose and the fitting. The yoke comprises a split annular band having ears through which tightening means extend. The yoke has a plurality of annularly extending portions projecting outwardly therefrom so as to have greater diameters than the annular portions of the yoke between the projecting portions. A plurality of elongated strips are attached to the yoke by bending one end portion around one of the projecting portions and then securing the bent back one end portion to an adjacent portion of the elongated strip by a rivet. In assembled relationship with the yoke seated in the annular recess in the fitting, the elongated strip has a plurality of radially inwardly directed projections which extend in a longitudinal direction relative to the fitting. A flexible hose is positioned over the fitting so that the flexible hose is located between the fitting and the elongated strips. A plurality of band clamps are provided with portions of each band clamp being seated in the inwardly directed projections of the elongated strip. When the band clamps are tightened, each band clamp forces a portion of the flexible hose against the fitting to form a seal between the fitting and the flexible hose and forces portions of the flexible hose into recesses formed between the radially inwardly directed projections to form means preventing relative longitudinal movement between the elongated strips and the flexible hose. The end portions of the elongated strip bent around the projecting portions of the yoke function to prevent relative longitudinal movement between the elongated strips and the fitting so as to retain the flexible hose and the fitting in the assembled relationship when pressure is applied within the flexible hose. While the foregoing structure functions well at certain pressures, there is a problem when higher pressures exist. Under those conditions, a failure can occur by a tearing of the yoke at the location where the elongated strip is bent around the projecting portions of the yoke.

SUMMARY OF THE INVENTION

This invention provides apparatus for use in connecting a flexible hose to a fitting and is particularly directed to apparatus for restraining relative longitudinal movement between the flexible hose and the fitting even under conditions of high internal pressure.

In the preferred embodiment of the invention, a plurality of elongated strips are used in conjunction with band clamps to cooperate with the flexible hose and the fitting to provide the restraint against relative longitudinal movement between the flexible hose and the fitting. One end portion of each elongated strip is bent back so as to be adjacent to the next succeeding portion of the elongated strip to form a shoulder on the elongated strip. A shoulder is provided on the fitting, which in the preferred embodiment of the invention comprises an annular recess formed in the outer surface of the fitting wherein the annular recess extends in a longitudinal direction a distance that is only slightly greater than the longitudinal extent of the bent back portion of the elongated strip.

In operation, the bent back end portion of each elongated strip is seated in the annular recess in the fitting. A band clamp is then positioned around the fitting and in contact with the next succeeding portion of each elongated strip so as to hold the bent back end portion in the recess. The remaining portion of the elongated strip is provided with conventional means which cooperate with the fitting, the flexible hose and band clamps to prevent relative longitudinal movement between the flexible hose and the elongated strips. When pressure is applied within the flexible hose relative longitudinal movement between the fitting and each elongated strip is prevented by contact between the shoulder formed by the bent back end portion and the shoulder formed by the end of the recess. This combination distributes the forces trying to cause relative longitudinal movement between the elongated strips and the fitting over the full width of each of the elongated strips so as to be able to provide resistance to greater forces trying to separate the fitting and the flexible hose.

It is an object of this invention to provide apparatus for restraining relative longitudinal movement between a fitting and a flexible hose by a new combination for joining elongated strips to the fitting.

It is another object of this invention to provide apparatus for restraining relative longitudinal movement between a fitting and a flexible hose that distributes the forces trying to effect relative movement between the fitting and the flexible hose over a greater width so as to be able to resist greater forces.

Other features and advantages of the invention will be apparent from the following more particular description of preferred embodiments as illustrated in the accompanying drawing in which like reference characters refer to the same parts throughout the various views. The drawing is not necessarily to scale, emphasis instead being placed upon illustrating the principles of the invention.

BRIEF DESCRIPTION OF THE DRAWING

FIG. 1 is a top plan view of an elongated strip of this invention;

FIG. 2 is a cross-sectional view along the line 2—2 of FIG. 1;

FIG. 3 is a view of complete assembly of the fitting, flexible hose, elongated strips and band clamps with parts in section; and FIG. 4 is a view in cross-section showing part of an assembly with a different fitting.

DETAILED DESCRIPTION OF THE INVENTION

In FIGS. 1 and 2, there is illustrated the preferred embodiment of the invention comprising an elongated strip 2 having one end portion 4 bent back so as to be located adjacent to the next succeeding portion 6. The bent back portion 4 forms a shoulder 8 for a purpose to be described. Integral with the next succeeding portion 6 is a section 10 that extends angularly from the next succeeding portion 6. The main body 12 of the elongated strip 2 extends generally in a direction parallel to the bent back portion 4 and the next succeeding portion 6 and is provided with a plurality of projections 14 each of which has a longitudinal extent. The projections 14 function to form a plurality of recesses 16 on one side of the elongated strip 2 and a plurality of recesses 18 on the other side of the elongated strip 2 for purposes to be described below. The number of recesses 16 and 18 in the elongated strip 2 will vary in accordance with the size of fitting and the flexible hose and the pressures to be encountered. The terminal portion 20 of the elongated strip 2 extends upwardly from the final recess 18 at an angle of about 90°.

An assembly comprising a fitting 22, a flexible hose 24, a plurality of elongated strips 2 and a plurality of band clamps 26 is illustrated in FIG. 3. The fitting 22 is circular in cross-section and has a threaded end 28 to which any suitable equipment may be secured. An annular recess 30 is formed in the outer surface of the fitting 22 so as to form a pair of shoulders 32 and 34. It is to be understood that other means may be utilized to form shoulders, such as an annular ring projecting from the outer surface of the fitting. The other end 36 of the fitting 22 has a diameter less than the diameter of the threaded end 28 and the portion having the annular recess 30. The outer surface 38 of the other end 36 is provided with a plurality of projections 40 which extend continuously in a circumferential direction around the outer surface 38. The projections 40 are of different sizes and are inclined in a direction toward the threaded end 28.

In one method of making the assembly illustrated in FIG. 3, a plurality of elongated strips 2 are positioned relative to the fitting 22 so that the bent back portions 4 are located in the annular recess 30 so that the shoulders 8 on the elongated strips 2 are in abutting relationship with the shoulder 34 of the recess 30. The elongated strips 2 are preferably spaced equidistantly apart around the fitting 22. A conventional band clamp 26 comprising overlapping layers 42 of banding and a clamp 44 is positioned around the fitting 22 so that when tightened, as illustrated in FIG. 3, the inner layer 42 of banding will contact the next succeeding portions 6 of the elongated strips 2 to retain the bent back portions 4 in the recess 30. The flexible hose 24 has an internal diameter 46 less than the diameter of the outer surface 38 of the other end 36 of the fitting 22. The flexible hose 24 is pushed over the outer surface 38 of the fitting 22 using conventional hose nipple pushers (not shown) until the end 48 of the flexible hose 24 is in contact with an annular shoulder 50 on the fitting 22. The band clamps 26 are positioned in the recesses 18 and tightened. As the band clamps 26 are tightened portions of the flexible hose 24 are forced into the recesses 16. The relationship between the elongated strips 2, the flexible hose 24 and the band clamps 26 is such that relative longitudinal movement between the elongated strips 2 and the flexible hose 24 is prevented. After the band clamps 26 have been tightened, the terminal portions 20 are bent down over the end band clamp 26 and another band clamp 26 is positioned so as to cover the bent over terminal portions 20 and then tightened. If desired, a second band clamp (not shown) may be placed around each band clamp 26.

The relationship between the fitting 22, the elongated strips 2 and the band clamp 26 with the shoulder 8 being located in abutting relationship with the shoulder 34 of the recess 30 prevents relative longitudinal movement between the elongated strips 2 and the fitting 22. The band clamp 26 acts on the next succeeding portion 6 of each elongated strip 2 so as to keep the bent back portion 4 seated in the recess 30. Thus, any relative longitudinal movement between each elongated strip 2 and the fitting is prevented by contact between the shoulder 8 on the bent back portion 4 and the shoulder 34 of the recess 30. This arrangement functions to distribute the forces acting to try to separate the fitting 22 from the elongated strips 2 over the full width of each elongated strip 2. Also, since the band clamp 26 holds the bent back portion 4 and the next succeeding portion in the contiguous relationship illustrate in FIG. 2, each elongated strip 2 can now resist forces to an extent substantially approaching the tensile strength of each elongated strip 2.

The fitting 22 in the assembly, partially illustrated in FIG. 4, is a flexible hose mender and has a central portion 52 having an annular recess 30a formed therein so as to provide shoulders 32a and 34a. The relationship between the fitting 52, the elongated strip 2 and the band clamp 26 is the same as described in relation to FIG. 3 in that the shoulder 8 of the bent back portion 4 is in abutting relationship with the shoulder 32a of the recess 30a so as to prevent relative longitudinal movement between the fitting 52 and the elongated strip 2 in one direction. The relationship between the fitting 52, the elongated strip 2a and the band clamp 26 is also similar in that the shoulder 8a of the bent back portion 4a is in abutting relationship with the shoulder 32a of the recess 30a so as to prevent relative longitudinal movement between the fitting 52 and the elongated strip 2a in the opposite direction.

The fittings 22 and 52 are relatively rigid and are formed from suitable materials such as carbon steel, or stainless steel. The flexible hose 24 comprises rubber, plastics or other conventional materials. The elongated strips 2 are formed from suitable high tensile strength materials such as carbon steel and stainless steel. The length, width and thickness of the elongated strips 2 and the number of band clamps used therewith is determined by the conditions to be encountered such as the size of the flexible hose and fitting and the internal pressures to be developed in the flexible hose and the fitting.

While the preferred embodiments of the invention have been illustrated and described herein, it may be otherwise embodied and practiced within the scope of the following claims.

What is claimed is:

1. Apparatus for restraining relative longitudinal movement between a fitting and a flexible hose comprising:

a relatively rigid fitting;

means forming at least one shoulder on said fitting and extending in a circumferential direction;

said fitting having a longitudinally extending first outer surface extending from adjacent to said one shoulder to one end of said fitting;

a flexible hose around said first outer surface;

said fitting having a longitudinally extending second outer surface extending from adjacent to said one shoulder toward the other end of said fitting;

at least two separate and elongated strips of material, each of said strips positioned to extend in a direction parallel to the longitudinal axis of said fitting;

one end of each of said elongated strips comprising a longitudinal portion that is bent back so as to be adjacent to the next succeeding longitudinal portion to form a shoulder on each of said elongated strips;

said shoulders on said elongated strips being located in direct abutting relationship with separate and circumferentially offset portions of said one shoulder so that longitudinal movement in substantially the direction of said one end of said fitting between the shoulder on each of said elongated strips and said one shoulder towards each other is limited by contact between the shoulder on each of said elongated strips and the corresponding said separate and circumferentially offset portion of said one shoulder, and so that substantially all of a longitudinal force applied to said elongated strips in substantially the direction of said one end of said fitting will be directly communicated to said separate and circumferentially offset portions of said one shoulder;

said elongated strips being positioned free from contact with each other;

the other end of each of said elongated strips being located over a portion of said flexible hose;

a first band clamp, positioned over said bent back portion and said next succeeding portion of each of said elongated strips, for holding said bent back portion of each of said elongated strips adjacent to a portion of said second outer surface, and for retaining the shoulder on each of said elongated strips in direct abutting relationship with said one shoulder; and at least a second band clamp around portions of said flexible hose and portions of each of said elongated strips for effecting a seal between said flexible hose and said first outer surface of said fitting and for preventing relative longitudinal movement between each of said elongated strips and said flexible hose.

2. Apparatus as defined in claim 1 and further comprising:
at least one recess formed in said second outer surface; and
said recess extending in a circumferential direction so that one end of said recess forms said one shoulder extending in a circumferential direction.

3. Apparatus as defined in claim 2 wherein:
said recess extending in a circumferential direction is annular so that said shoulder is annular.

4. Apparatus as in claim 1 and further comprising:
at least three of said elongated strips.

5. Apparatus as in claim 1 wherein:
said second outer surface has a diameter greater than the diameter of said first outer surface; and
said one shoulder extending in a circumferential direction is annular and comprises:
a longitudinally extending annular recess in said second outer surface; and
one end of said recess forming an annular shoulder.

6. Apparatus as in claim 5 and further comprising:
said bent back portions of said elongated strips being located in said annular recess and retained therein by said first band clamp.

7. Apparatus for restraining relative longitudinal movement between a fitting and two hoses comprising:
a relatively rigid fitting;
a first longitudinally extending outer surface on said fitting;
a second longitudinally extending outer surface extending from one side of said first outer surface to one end of said fitting;
a third longitudinally extending outer surface extending from the other side of said first outer surface to the other end of said fitting;
said first outer surface having a diameter greater than the diameter of either said second outer surface or said third outer surface;
a first flexible hose around said second outer surface;
a second flexible hose around said third outer surface;
means associated with said first outer surface for forming a pair of shoulders extending in a circumferential direction, said shoulders facing in opposite directions;
a first elongated strip of material positioned to extend in a direction parallel to the longitudinal axis of said fitting;
one end of said first elongated strip comprises a portion of said first elongated strip bent back so as to be adjacent to the next succeeding portion of said first elongated strip to form a shoulder on said first elongated strip;
said shoulder on said first elongated strip being located in abutting relationship with a limited portion of one of said pair of shoulders so that longitudinal movement in substantially the direction of said one end of said fitting between said shoulder on said first elongated strip and said one of said pair of shoulders toward each other is limited by contact between said shoulder on said first elongated strip and said limited portion of said one of said pair of shoulders, and so that substantially all of a longitudinal force applied to said first elongated strip in substantially the direction of said one end of said fitting will be directly communicated to said limited portion of said one of said pair of shoulders;
the other end of said first elongated strip being located over a portion of said first flexible hose around said second outer surface;
at least first clamp means around portions of said first flexible hose and portions of said first elongated strip for effecting a seal between said first flexible hose and said second outer surface of said fitting and for preventing relative longitudinal movement between said first elongated strip and said first flexible hose;
a second elongated strip of material, separate from said first elongated strip of material, and positioned to extend in a direction parallel to the longitudinal axis of said fitting;
one end of said second elongated strip comprises a portion of said second elongated strip bent back so as to be adjacent to the next succeeding portion of said second elongated strip to form a shoulder on said second elongated strip;
said shoulder on said second elongated strip being located in abutting relationship with a limited portion of the other of said pair of shoulders so that longitudinal movement in substantially the direction of said other end of said fitting between said shoulder on said second elongated strip and said other of said pair of shoulders toward each other is limited by contact between said shoulder on said second elongated strip and said limited portion of said other of said pair of shoulders, and so that substantially all of a longitudinal force applied to said second elongated strip in substantially the direction of said other end of said fitting will be directly communicated to said limited portion of said other of said pair of shoulders;

the other end of said second elongated strip being located over a portion of said second flexible hose around said third outer surface;

second clamp means for holding said bent back portion of said first elongated strip and said bent back portion of said second elongated strip adjacent to separate and offset portions of said first outer surface; and at least third clamp means around portions of said second flexible hose and portions of said second elongated strip for effecting a seal between said second flexible hose and said third outer surface of said fitting and for preventing relative longitudinal movement between said second elongated strip and said second flexible hose.

8. Apparatus as defined in claim 7 wherein:
said pair of shoulders extending in a circumferential direction are annular.

9. Apparatus as defined in claim 8 and further comprising:
an annular longitudinally extending recess formed in said first outer surface with each end of said recess forming said pair of annular shoulders facing in opposite directions.

10. Apparatus as defined in claim 9 and further comprising:
a plurality of elongated strips having shoulders in abutting relationship with said annular shoulder formed by one end of said recess;
a plurality of elongated strips having shoulders in abutting relationship with said annular shoulder formed by the other end of said recess; and
said second clamp means holding all of said bent back portions in said annular recess.

* * * * *